United States Patent
Trindade et al.

(10) Patent No.: US 6,621,664 B1
(45) Date of Patent: Sep. 16, 2003

(54) PERPENDICULAR RECORDING HEAD HAVING INTEGRATED READ AND WRITE PORTIONS

(75) Inventors: Isabel Goncalves Trindade, Pittsburgh, PA (US); Gregory John Parker, Gibsonia, PA (US); Sharat Batra, Wexford, PA (US); Robert Rottmayer, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 145 days.

(21) Appl. No.: 09/795,581

(22) Filed: Feb. 28, 2001

Related U.S. Application Data

(60) Provisional application No. 60/185,259, filed on Feb. 28, 2000, provisional application No. 60/221,671, filed on Jul. 27, 2000, and provisional application No. 60/251,242, filed on Dec. 4, 2000.

(51) Int. Cl.[7] .................................................. G11B 5/39
(52) U.S. Cl. ........................ 360/318; 360/313; 360/314
(58) Field of Search ................................ 360/318, 318.1, 360/324, 324.1, 324.11, 324.12, 324.2, 314, 313, 315, 125, 126

(56) References Cited

U.S. PATENT DOCUMENTS

| | | | |
|---|---|---|---|
| 4,423,450 A | 12/1983 | Hamilton | 360/111 |
| 4,987,509 A | 1/1991 | Gill et al. | 360/315 |
| 5,406,433 A | 4/1995 | Smith | 360/315 |
| 5,446,613 A | 8/1995 | Rottmayer | 360/319 |
| 5,576,914 A | 11/1996 | Rottmayer et al. | 360/324 |
| 5,668,688 A | 9/1997 | Dykes et al. | 360/324.1 |
| 5,726,839 A * | 3/1998 | Shinohara et al. | 360/318 |
| 5,751,526 A | 5/1998 | Schemmel | 360/317 |
| 5,759,681 A | 6/1998 | Hosoe et al. | 428/332 |
| 5,784,224 A | 7/1998 | Rottmayer et al. | 360/324 |
| 5,786,957 A | 7/1998 | Inoue et al. | 360/77.08 |
| 5,809,637 A | 9/1998 | Rottmayer | 29/603.15 |
| 5,835,316 A * | 11/1998 | Mukaide et al. | 360/126 |
| 5,869,963 A | 2/1999 | Saito et al. | 324/252 |
| 5,870,260 A * | 2/1999 | Davies et al. | 360/313 |
| 5,883,763 A | 3/1999 | Yuan et al. | 360/324 |
| 5,995,339 A * | 11/1999 | Koshikawa et al. | 360/321 |
| 6,081,408 A | 6/2000 | Partee | 360/317 |
| 6,128,166 A * | 10/2000 | Tanaka et al. | 360/317 |
| 6,134,089 A | 10/2000 | Barr et al. | 360/322 |
| 6,134,090 A | 10/2000 | Mao et al. | 360/324.1 |
| 6,150,045 A | 11/2000 | Saito et al. | 428/692 |
| 6,292,329 B1 * | 9/2001 | Sato et al. | 360/126 |
| 6,392,849 B2 * | 5/2002 | Maruyama et al. | 360/314 |
| 6,462,916 B1 * | 10/2002 | Hokkyo | 360/317 |
| 6,556,388 B1 * | 4/2003 | Everitt et al. | 360/314 |
| 2001/0012187 A1 | 8/2001 | Lai et al. | 360/324.11 |
| 2002/0075608 A1 * | 6/2002 | Kawato | 360/314 |

* cited by examiner

*Primary Examiner*—Jefferson Evans
(74) *Attorney, Agent, or Firm*—Robert P. Lenart, Esq.; Pietragallo, Bosick & Gordon

(57) ABSTRACT

An integrated read/write perpendicular recording head facilitates the use of magnetic storage media having a high magnetic recording density and high data rates. The use of a perpendicular write portion provides adequate space between the main and opposing poles for a read element and associated electrical contacts therebetween. The use of a differential dual spin valve as a read element eliminates the need for magnetic shielding of the read element. Such a structure permits the read element and main write pole to be close together, thereby minimizing seek time, and permitting rapid transition from read to write operations, and vice versa.

8 Claims, 11 Drawing Sheets

PERPENDICULAR RECORDING HEAD HAVING INTEGRATED READ AND WRITE PORTIONS

CROSS REFERENCE TO RELATED APPLICATIONS

This application claims the benefit of U.S. Provisional Patent Application No. 60/185,259, filed Feb. 28, 2000, U.S. Provisional Patent Application No. 60/221,671, filed Jul. 27, 2000, and U.S. Provisional Patent Application No. 60/251,242, filed Dec. 4, 2000.

BACKGROUND OF THE INVENTION

1. Field of the Invention

The present invention relates to integrated read/write perpendicular recording heads. More specifically, the invention relates to locating a read element between the main pole and the flux return pole portions of the writer.

2. Description of the Related Art

Recording heads for use with magnetic storage media have typically been of the longitudinal type, utilizing a pair of opposing write poles with their tips in close proximity to each other at the bottom surface of the recording head. The two poles are connected typically at the top by a yoke, typically made of the same ferromagnetic material as the poles. A coil is located in close proximity to one of the two opposing poles. When current passes through the coil, magnetic flux is induced in the yoke which produces a magnetic field with a bubble-like contour, across a gap separating the two poles. A portion of the magnetic flux across the write gap will pass through the magnetic storage medium, thereby causing a change in the magnetic state within the magnetic storage medium where the head field is higher than the media coercive force. The media coercive force is chosen high enough so that only the head fields across a narrow gap of a thin film inductive head, flowing with a slider on a air bearing between the surfaces of the disk and the slider, modify the bits of information on the storage media.

The bits of information are recorded on the disk along concentric tracks that are separated by guard bands. The width of the track plus that of the guard-band in which no information is stored defines the track density. The length of the bit along the track defines the linear density. The total storage capacity is directly proportional to the product of track density and linear density. The increase in linear density also enhances the data transfer rate. The demand for higher storage capacity and higher data rates led to the redesign of various components of disk drives.

The recording densities possible with longitudinal recording are limited to approximately 50 to 100 G bit/inch$^2$, because at higher recording densities, superparamagnetic effects result in magnetic instabilities within the magnetic storage medium.

Perpendicular recording has been proposed to overcome the recording density limitations of longitudinal recording. Perpendicular recording heads for use with magnetic storage media typically include a pair of magnetically coupled poles, consisting of a main write pole having a small bottom surface area, and a flux return pole having a large bottom surface area. A coil is located adjacent to the main write pole, for inducing a magnetic field between that pole and a soft underlayer. The soft underlayer is located below the recording layer of the magnetic storage medium and enhances the amplitude of the field produced by the main pole. This in turn allows the use of media with higher coercive force, consequently, more stable bits can be stored in the media. In the recording process, an electrical current in the coil energizes the main pole, which produces a magnetic flux density field. The image of this field is produced in the soft underlayer, such that about double the field strength is produced in the magnetic media. The flux density that diverges from the tip into the soft underlayer returns to the main pole through the return flux pole. The return pole is located sufficiently far apart from the main pole, such that the soft material of the return pole does not affect the magnetic flux of the main pole, which is directed vertically into the hard layer and soft underlayer. Significantly higher recording densities may therefore be used before magnetic instabilities become an issue.

Originally, retrieval of the information stored in magnetic disks was accomplished with an inductive head. The rate of change of magnetic field passing through the gap between the poles of the recording head would induce a voltage across the coils. The voltage signal was directly proportional to the rate of change of the field across the gap. Since the 80's, magnetoresistive heads replaced thin film inductive heads for the reading process because they produce considerably higher change of voltage while sensing magnetic flux incoming from magnetic patterns of the media.

To overcome the limitations of inductive reading, various magnetoresistive (MR) read elements have been proposed. Such read elements are typically located between a pair of shields made from soft magnetic material similar to that used in the inductive heads. The shields define the linear resolution of the read head, as they prevent that the sensor from being affected by magnetic fields other than that from the bit being read.

For a decade, the magnetoresistive elements consisted of Permalloy thin films and exhibited an anisotropic magnetoresistive (AMR) effect. As the areal density requirement in disk drives approached 10 Gbit/in$^2$, the AMR heads could not provide enough sensitivity for adequate signal to noise ratio even if they used extremely high electrical current. A new magnetoresistive effect, discovered in the early 80's needed to be applied. The magnetoresistive (MR) read element that has been adopted by most of the industry for magnetic disk drives is the spin valve sensor. The spin valve provides a spin dependent giant magnetoresistance effect with a very thin sensor layer. Hence, it exhibits enough sensitivity for current disk drives. The spin valve is generally composed of a pair of ferromagnetic layers having a nonmagnetic layer therebetween. One of the ferromagnetic layers is adjacent and in direct contact with an antiferromagnetic layer. The antiferromagnetic layer produces a unidirectional anisotropic field in the ferromagnetic layer. The unidirectional field is strong enough to remain constant during the head operation. The combination of the ferromagnetic layer and adjacent antiferromagnetic layer is commonly known as the pinned layer, with the opposite ferromagnetic layer known as the free layer. When the spin valve is exposed to a magnetic field, the orientation of the magnetization of the free layer will change accordingly. The change in the orientation of the magnetization of the free layer relative to the pinned layer will alter the spin dependent scattering of conduction electrons, thereby increasing or decreasing the resistance of the spin valve element. The change in resistance produces a corresponding change in the voltage signal for an applied electrical current. A constant voltage level indicates a binary "0" and a changing voltage level indicates a binary "1."

Despite the fact that the spin valve provided enough sensitivity for 10 Gbit/in$^2$ areal density, the rapid pace of storage capacity increase required for current applications could not be overlooked. A dual spin valve was then proposed, wherein a second pinned layer and electroconductive layer are placed on the opposite side of the free layer. The dual spin valve (DSV) could provide higher signal output than the spin valve. The drawback of the DSV consisted in the need for a synthetic antiferromagnet (SAF) to overcome the fields of the two reference layers. This requirement resulted in a structure considerably thicker than the spin valve itself, which led to a large increase in minimum shield-to-shield spacing. The shield-to-shield spacing of the SV or the DSV, corresponding approximately to twice the read-back gap length, ultimately defines the read head linear resolution. Hence, the DSV was not pursued, because it exhibited lower signal output at higher linear densities.

The need for increasing the speed of the read and write operations, combined with the increasing storage density within the magnetic storage media, make it desirable to integrate a read head with very high linear resolution and sensitivity in very close proximity to the write head. The spatial distance between the write and read head require complex arm operations to correct it and increase seek time. For these reasons, some recording heads use a shared pole integrated scheme, in which the flux return pole of the writer functions as one of two opposing shields of the reader.

There are several important considerations for integrating the read and write portions of a recording head. The read element must not be placed in a location where it will be exposed to the strong magnetic fields generated by the opposing write poles. Exposing the read element to such strong magnetic fields creates a risk of electrostatic damage to the read elements, and could possibly change the default magnetizations of the ferromagnetic layers within the read elements. Furthermore, steps must be taken to ensure that magnetic fields adjacent to the magnetic field of the domain currently being read do not affect the read element. Therefore, either shields must be provided for the read elements, or a read element that is not sensitive to magnetic fields adjacent to the fields being read are required.

Accordingly, there is a need for a recording head having integrated read/write portions. Additionally, there is a need to protect the read element within such a recording head from the magnetic fields generated from the write portion of the recording head. Furthermore, there is a need to protect the read element within such a recording head from being influenced by magnetic fields adjacent to the magnetic fields currently being read. Finally, the shields of the read head, if in close proximity of the recording main pole, should not affect the side writing and the field amplitude and contour in the storage layer.

SUMMARY OF THE INVENTION

The present invention is a perpendicular recording head integrating an unshielded magnetoresistive read head provided with high sensitivity and high linear resolution for very high performance hard disk drives.

A perpendicular recording head includes a main pole, a flux return pole magnetically coupled to the main pole, and an electrically conductive coil adjacent to the main pole. The bottom of the flux return pole has a surface area greatly exceeding the surface area of the main pole's tip. The recording head includes a read element, a differential dual spin valve, located between the main and opposing poles. Electrical conductor leads are located at each end of the differential dual spin valve.

The structure and function of a differential dual spin valve is best understood through an explanation of a single spin valve and a dual spin valve. The spin valve is generally composed of a pair of ferromagnetic layers having a non-magnetic layer therebetween. One of the ferromagnetic layers is adjacent and in direct contact with an antiferromagnetic layer. The antiferromagnetic layer produces a unidirectional anisotropy field in the ferromagnetic layer, which is strong enough to remain constant during the head operation. The combination of the ferromagnetic layer and adjacent antiferromagnetic layer is commonly known as the pinned layer, with the opposite ferromagnetic layer known as the free layer. When the spin valve is exposed to a magnetic field, the orientation of the magnetization of the free layer will change accordingly. The change in the orientation of the magnetization of the free layer relative to the pinned layer will alter the spin dependent scattering of conduction electrons, thereby increasing or decreasing the resistance of the spin valve element. The change in resistance produces a change in a voltage signal for an applied electrical current. A constant voltage level indicates a binary "0" and a changing voltage level indicates a binary "1."

A dual spin valve consists of one free layer and two pinned layers. The free layer is located in the center of two opposing pinned layers, each separated from the free layer by a Cu spacer. The pinned layers incorporate a synthetic antiferromagnetic layer as an antiferromagnetic layer. The synthetic antiferromagnet comprises two ferromagnetic layers that are indirectly antiferromagnetically coupled through a metallic interlayer, for example, Ru.

The spin valve head and the dual spin valve head incorporate a pair of shields located at both ends of the MR element. Electrical leads and associated insulators are located between the read element and each shield, being dimensioned and configured to apply a sense current across the read element. The sensor must be electrically insulated from the shields. The thickness of the electrical insulator plus half of the read element thickness define the reproduce gap of the head. Good electrical insulation between the read element and the shields must be provided because the electrical current carried by the leads flows parallel to the layers of the sensor, in the so-called current in the plane (CIP) geometry. In this geometry, electrical contact between the shields and the read-element would produce shunting of current and signal amplitude loss.

A differential dual spin valve includes a pair of spin valves positioned end to end, so that the pinned layers are on the outside of the complete structure, and the free layers are towards the center. The two free layers are separated by an electrically conductive gap film that physically defines the reproduce gap. That is to say that the head does not require shields for linear resolution. Like in the spin valve head, the default magnetization of each free layer will align along the track width of the sensor, which is aligned parallel to the recording track of the media. The magnetizations of the pinned layers are aligned orthogonal to the track-width and antiparallel to each other. Hence, when the free layers rotate together toward the same orientation in response to a uniform field, in one spin valve the free layer will be rotating from orthogonal to parallel to the reference layer and in the other spin valve, the free layer will be rotating from orthogonal to antiparallel to the pinned layer. In the current perpendicular to the plane (CPP) geometry, the electrical current flows perpendicular to the plane of the layers. The net voltage across the two spin valves, electrically connected in series through the metallic gap spacer, is given by the sum of the variation of resistance in each spin valve multiplied by the applied current. Consequently, the sum of the responses of two spin valves electrically connected in series, having antiparallel pinned layers, yield zero variation of voltage when their free layer magnetizations are rotated by the same angle amount together toward the same direction. On the other hand, when the gap of the differential dual spin valve is placed above a change in the orientation of the magnetization within the magnetic storage medium, the spin valves will sense opposite oriented magnetic fields, producing rotations of magnetizations toward opposite orientations. Hence, one free layer will rotate to parallel to the pinned layer while the other free layer will rotate parallel to its reference layer. The total change of resistance will correspond to the sum of that of each spin valve.

When reading from a magnetic storage medium having a constant magnetization, the magnetization in each free layer will be oriented to conform to the magnetization of that portion of the magnetic storage medium directly below each individual free layer. Therefore, pinned and free layers within one portion of the differential dual spin valve will have parallel orientations, and the magnetizations within the pinned and free layers of the other portion of the differential dual spin valve will have antiparallel magnetizations. One portion of the differential dual spin valve will therefore have minimum resistance, and the other portion will have maximum resistance. The result is that the overall differential dual spin valve structure will have a medium level of resistance. When the magnetization within the storage medium changes from upward to downward, or from downward to upward, the spin valves will briefly be located over domains of the magnetic storage medium having opposing magnetizations. The magnetizations within the free layers will therefore rotate to correspond to the magnetizations within the magnetic storage medium domains over which the spin valves are located. Resistance within both differential dual spin valve portions will therefore either be minimized or maximized, depending upon whether the magnetizations of the free layer and corresponding pinned layer are parallel or antiparallel. It follows that minimized resistance in both portions of the differential dual spin valve results in minimized resistance for the entire differential dual spin valve structure, and maximized resistance in both portions of the differential dual spin valve results in maximized resistance for the entire spin valve structure. This resistance will be tested by a sensed current passed through the differential dual spin valve. The electrical contacts may be located in contact with the pinned layers on each end of the differential dual spin valve, resulting in the sense current being applied perpendicular to the plane of the layers of the differential dual spin valve (CPP).

The combination of a perpendicular recording head with a differential dual spin valve resolves many of the difficulties that would otherwise be associated with such an integrated read/write head. Whereas a longitudinal write head directs magnetic flux across the gap between the opposing write poles (and therefore across any read elements located between the poles), a perpendicular recording head directs magnetic flux downward through an upper recording layer of a magnetic storage medium, across through a soft underlayer of the storage medium, and then back to the flux return pole to form a complete loop. The return pole must be located sufficiently far apart from the main pole to not disturb the magnetic flux path from the main pole into the storage media. Likewise, shields near the main pole needed to be placed far apart from the main pole for the exact same reason. On the other hand, an unshielded read element like the differential dual spin valve above described could be incorporated between the main and opposing poles of a perpendicular recording head. In this integration scheme the read element is located between the write head poles but apart from each pole by a factor of three to four times the distance between the poles and the soft underlayer. With this structure, the strong magnetic fields generated during a write operation will not cause deterioration in the read head. Therefore, a differential dual spin valve may be utilized in a location where the write poles provide only limited magnetic shielding, and wherein an additional ferromagnetic shielding structure could distort the write field contour.

It is therefore an aspect of the present invention to provide a perpendicular recording head having integrated read and write portions.

It is another aspect of the present invention to provide a perpendicular recording head having a read element disposed between the main write pole and the flux return pole.

It is a further aspect of the present invention to provide an integrated read/write recording head wherein magnetic fields generated by the write poles will not adversely affect the read element.

It is another aspect of the present invention to provide an integrated read/write perpendicular recording head having a read element capable of functioning with only minimal magnetic shielding.

It is a further aspect of the present invention to provide an integrated read/write perpendicular recording head wherein the main write pole and read element are separated by a small distance for high data rate applications.

It is a further aspect of the present invention to provide an integrated read/write perpendicular recording head for very high areal density and very high data transfer rate applications wherein the main write pole produces strong magnetic fields, capable of switching the magnetization of a storage layer provided with very high coercive force, and the read head provides a sensitivity comparable to or higher than that of a dual spin valve but with a considerably higher linear resolution.

These and other aspects of the present invention will become more, apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The present invention is a perpendicular recording head for use with magnetic storage media, having integrated read and write portions. Integrated read and write portions are defined as a read portion contained within the write portion, for example, between the opposing poles.

Figure 1:
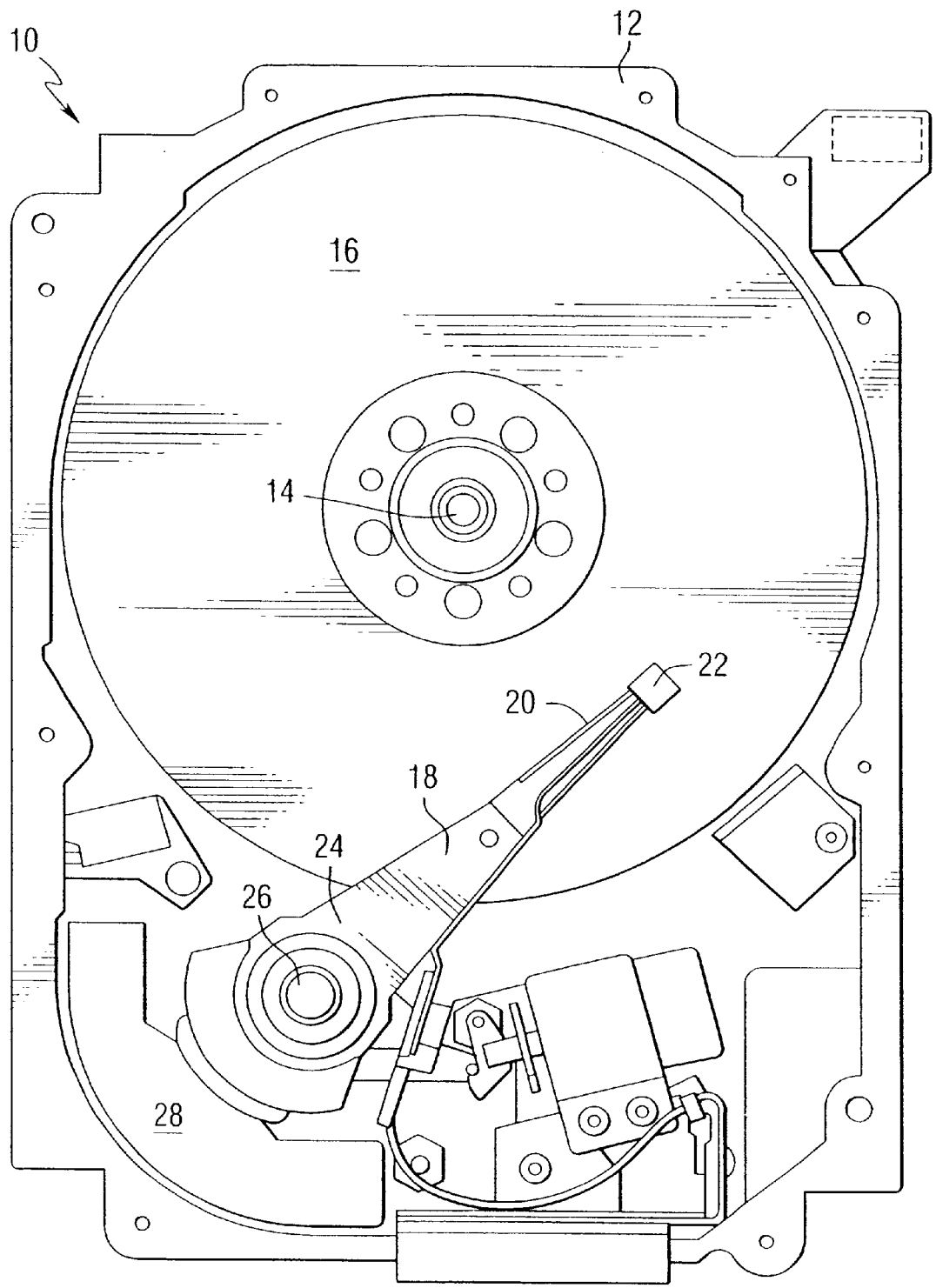
FIG. 1 is a top view of a typical hard disc drive for a computer for which the present invention may be used, illustrating the disc drive with its upper housing portion removed.

The invention will most commonly be used within a fixed disc drive 10 for computers, one of which is illustrated in FIG. 1. The fixed disc drive 10 includes a housing 12 (with the upper portion removed and the lower portion visible in this view for maximum clarity) dimensioned and configured to contain and locate the various components of the disc drive 10. The disc drive 10 includes a spindle motor 14 for rotating at least one magnetic storage medium 16 within the housing, in this case a magnetic disc. At least one arm 18 is contained within the housing 12, with each arm 18 having a first end 20 with a recording head or slider 22, and a second end 24 pivotally mounted to a bearing 26. An actuator motor 28, such as a movable coil DC motor, is located at the arm's second end 24, pivoting the arm 18 to position the head 22 over a desired sector of the disc 16. The actuator motor 28 is regulated by controller which is not shown and which is well known.

Figure 2:
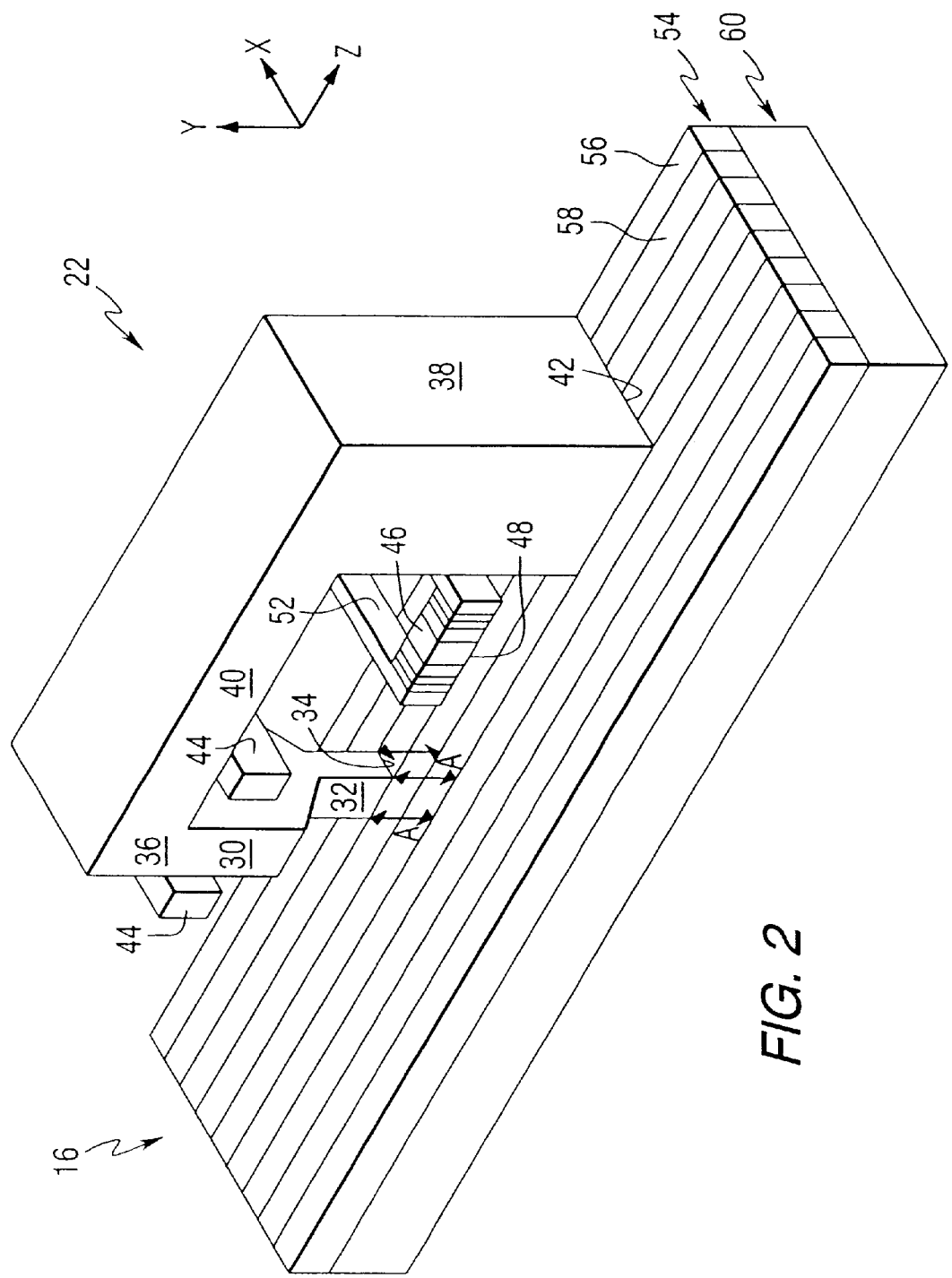
FIG. 2 is a partially schematic, isometric view of a perpendicular recording head according to the present invention.

Referring to FIG. 2, a recording head 22 of the present invention is illustrated. The recording head 22 includes a magnetically permeable main pole 30, oriented substantially perpendicular to the magnetic storage medium 16, and having a tip 32. The tip 32 includes a bottom surface 34. The top 36 of the main pole 30 is magnetically coupled to a flux return pole 38, possibly through a yoke 40. The flux return pole 38 includes a bottom surface 42, having a substantially larger surface area than the surface 34. An electrically conductive coil 44 is located adjacent to the main pole 30, and is dimensioned and configured to induce a magnetic flux in the main pole 30. The coil 44 is preferably surrounded by insulating material, as is well known in the art.

A read element 46 is located between the main pole 32 and flux return pole 38, with the bottom surface 48 of the read element 46 approximately even with the bottom surface 34 of the main pole 30, and bottom surface 42 of the flux return pole 38. As will be explained in detail below, the read element 46 is a differential dual spin valve. A pair of electrical contacts 50, 52 are located on either end of the read element 46 and are dimensioned and configured to supply a sensed current to the read element 46.

FIG. 2 also illustrates a magnetic storage medium 16 for use with a recording head 22. The magnetic storage medium, here a disc, includes a recording layer 54 having a plurality of magnetically permeable tracks 56, which are divided into sectors. Each sector has several different magnetic orientations within the magnetically permeable material (not shown, but well understood). The tracks 56 are separated by guard-bands 58. The disc 16 also includes a magnetically permeable lower layer 60, which is magnetically soft relative to the tracks 56. In use, the disc 16 will be separated from the tip 32 of the main pole 30 by a flying height A. The flying height A is sufficiently small so that a high concentration of flux from the main pole 30 will pass through the tracks 56, but sufficiently large to prevent damage to the disc 16 from contact with the recording head 22.

Figure 3:
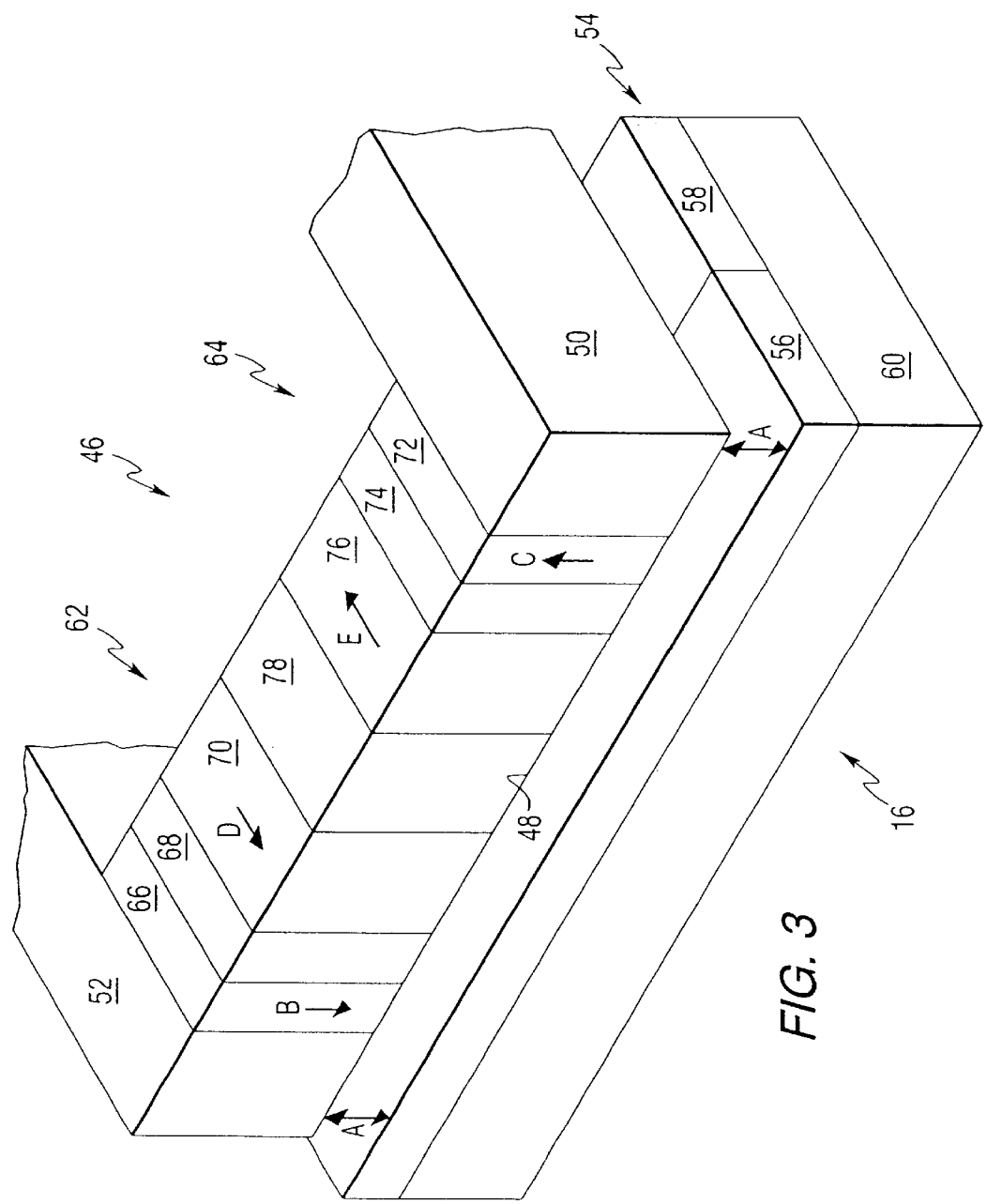
FIG. 3 is a partially schematic, isometric view of a differential dual spin valve according to the present invention, showing the default magnetizations within the various layers of the differential dual spin valve.

Referring to FIG. 3, the read element 46 is shown in greater detail. The read element illustrated in FIG. 3 is an example of a differential dual spin valve that will work with the present invention. The read element 46 includes a first spin valve portion 62, and second spin valve portion 64. The first spin valve portion 62 includes a pinned layer 66, having a ferromagnetic layer and an antiferromagnetic layer (not shown and well known in the art). An electroconductive layer 68 is adjacent to the pinned layer 66, and a ferromagnetic layer known as the free layer 70 is adjacent to the electroconductive layer 68. Likewise, the spin valve portion 64 includes a pinned layer 72, having an antiferromagnetic layer coupled with a ferromagnetic layer (not shown and well understood). An electroconductive layer 74 is adjacent to the pinned layer 72, and a ferromagnetic free layer 76 is adjacent to the electroconductive layer 74. The free layers 70, 76 are separated by an electrically conductive gap film 78. FIG. 3 also illustrates the default magnetizations within the various layers of the differential dual spin valve 46. The pinned layer 66, 72 will always have antiparallel magnetizations, with the illustrated example including a magnetization B in pinned layer 66 oriented downward, and a magnetization C in the pinned layer 72 oriented upward. The free layers 70, 76 have default magnetizations D, E oriented parallel to the surface of the magnetic storage medium 16. The default orientations of the magnetizations D, E are antiparallel in the illustrated example, but may have other relationships, such as parallel, in other embodiments. In all embodiments, the magnetizations D, E will rotate in response to magnetic fields generated by magnetic domains within the track 56. The various layers of the differential dual spin valve 46 are oriented substantially perpendicular to an imaginary line extending along the air-bearing surface from the central axis of the main write pole 30 to the central axis of the flux return pole 38 (corresponding to the bottom surfaces 34, 42). In many embodiments, these layers will also be perpendicular to the tracks 56.

Writing to the magnetic storage medium 16 is best explained referring back to FIG. 2. The disc 16 is rotated relative to the recording head 22 so that the recording head 22 is located above the appropriate sectors of the track 56. As recording progresses, the disc 16 will move past the recording head 22. Current will be supplied to the coil 44, thereby inducing a magnetic field within the main pole 30. As a portion of the sector of the track 56 passes under the main pole 30, the orientation of its magnetic moment will correspond to the orientation of the magnetic moment of the main pole 30. As the main pole 30 passes over the disc 16, the direction of current passing through the coil 44 will remain constant when a binary "0" is being recorded, thereby creating a consistent orientation of the magnetic fields within the track 56. The current passing through the coil 44 will reverse direction when a binary "1" is being recorded, thereby changing the orientation of a magnetic field within the track 56.

Figure 5:
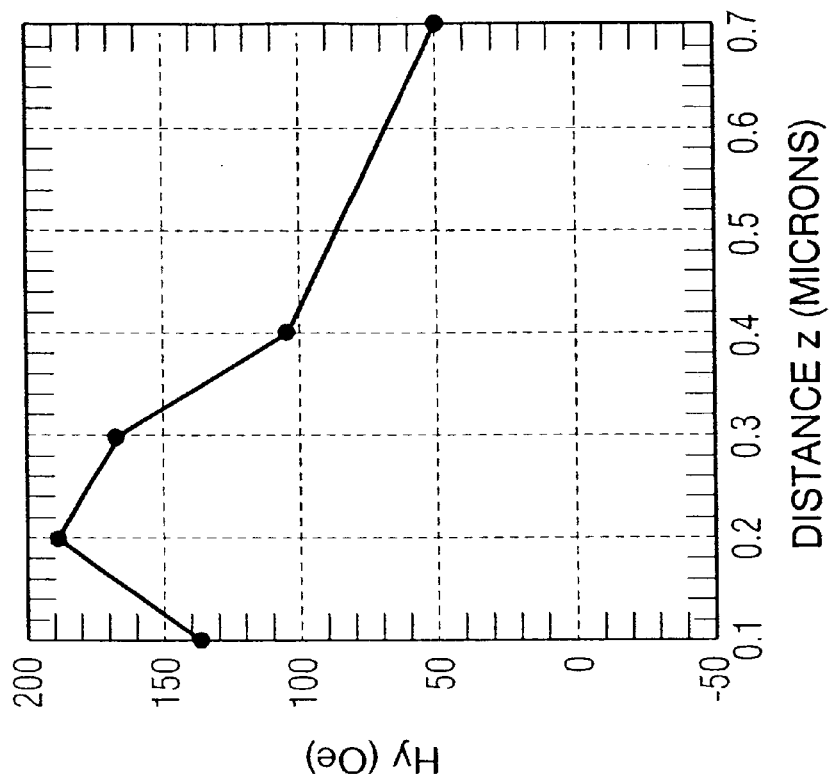
FIG. 5 is a graph illustrating magnetic field strength in the direction perpendicular to the track as a function of distance from the main write pole.
Figure 4:
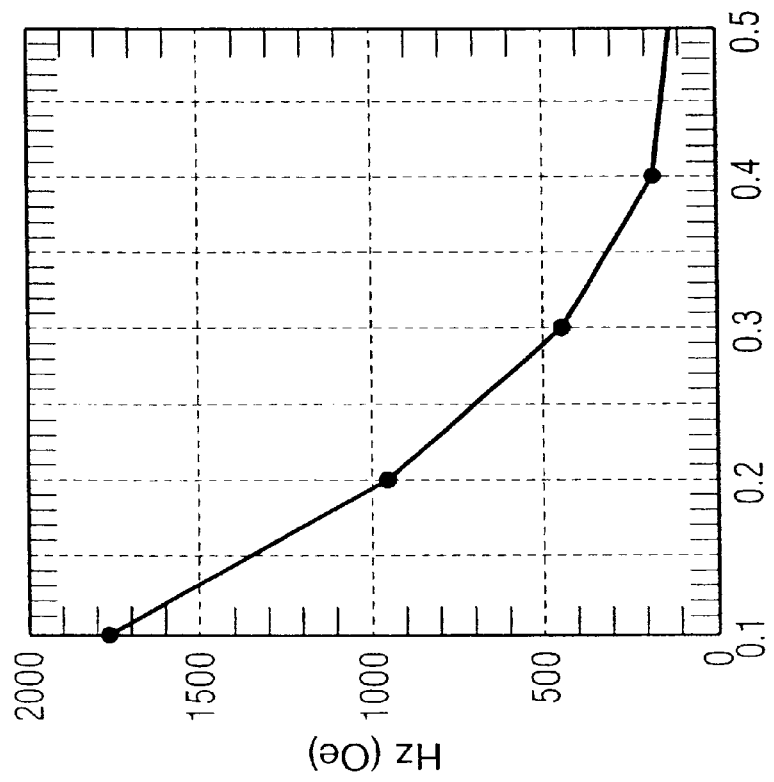
FIG. 4 is a graph indicating magnetic field strength along the direction of the track as a function of distance from the main write pole.

During the above-described writing process, magnetic flux from the main pole 30 will primarily pass downward through a track 56, and into the soft underlayer 60. The magnetic flux will then pass through the soft underlayer 60 to a point directly below the flux return pole 38, where the flux will pass through one or more tracks 56 to the flux return pole 38. The flux will continue through the flux return pole 38 and yoke 40 back to the main pole 30, thereby forming a complete loop. Because the path of the flux between the main pole 30 and flux return pole 38 passes through the soft underlayer 60, as opposed to directly from one pole to the other, the bulk of the strong magnetic write field generated within the main pole 30 is kept away from the read elements 46. FIG. 4 illustrates magnetic field strength in the horizontal direction as a function of horizontal distance from the main pole 30. FIG. 5 illustrates magnetic field strength in the vertical direction as a function of horizontal distance from the main pole 30. FIGS. 4 and 5 illustrate that the largest field component produced by the tip 32 of the main pole 30 at a distance of 0.1 $\mu$m between the read element 46 and main pole tip 32 is perpendicular to the plane of the various layers of the read element 46. This magnetic field is therefore unlikely to affect the magnetizations within these layers.

An advantage of perpendicular recording is that the distance between the main pole and flux return pole 38 may be selected from within a relatively large range of distances in the range of 1 $\mu$m to 10 microns. A typical example distance between the main pole 30 and flux return pole 38 is approximately 2.5 $\mu$m. A typical read element 46 will be approximately 100 nm long. A typical combination of a read element 46 and leads 50, 52 will be less than 1 $\mu$m long, and more typically will be in the range of 800–900 nm long. Therefore, not only is there sufficient room between the main pole 30 and flux return pole 38 to contain the read element 46 and associated electrical contacts 50, 52, but there is also sufficient room between the main pole 30 and flux return pole 38 to permit a distance of at least 0.1 $\mu$m between the main pole 30 and read element 46.

Figure 6:
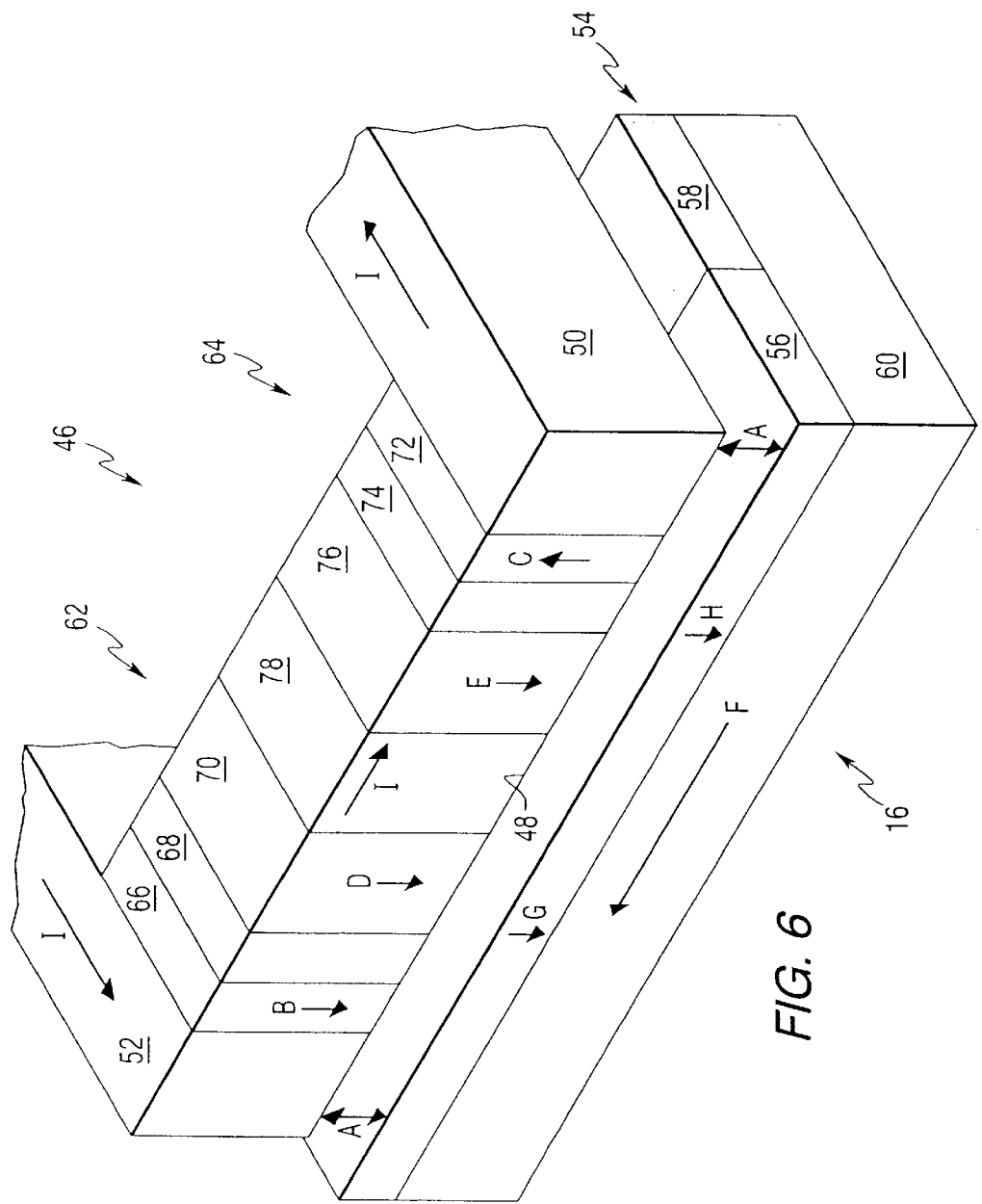
FIG. 6 is a partially schematic, isometric view of a differential dual spin valve according to the present invention, illustrating the magnetizations within the layers of the differential dual spin valve during a read operation performed on a magnetic storage medium having a constant downward magnetization.

Reading from the magnetic storage medium 16 is illustrated in FIGS. 6–9. Referring to FIG. 6, the magnetic storage medium 16 is moved in the direction of arrow F past the read element 46. The magnetizations G and H within the track 56 are both oriented downward. A test current I is passed through the read element 46, thereby detecting changes in the resistance to the read element 46. The magnetizations D, E within the free layers 70, 76 will both be acted upon by the magnetic fields generated by the magnetizations G and H within the track 56. The magnetizations D and E will both therefore rotate to align themselves with the magnetizations G and H. The first spin valve portion 62 will therefore have its minimum level of resistance, because the magnetizations B and D will be parallel. The second spin valve portion 64 will have its maximum resistance because the magnetizations C and E are antiparallel. The combined result is that the entire spin valve 46 will have a medium level of resistance, corresponding to a binary "0."

Figure 7:
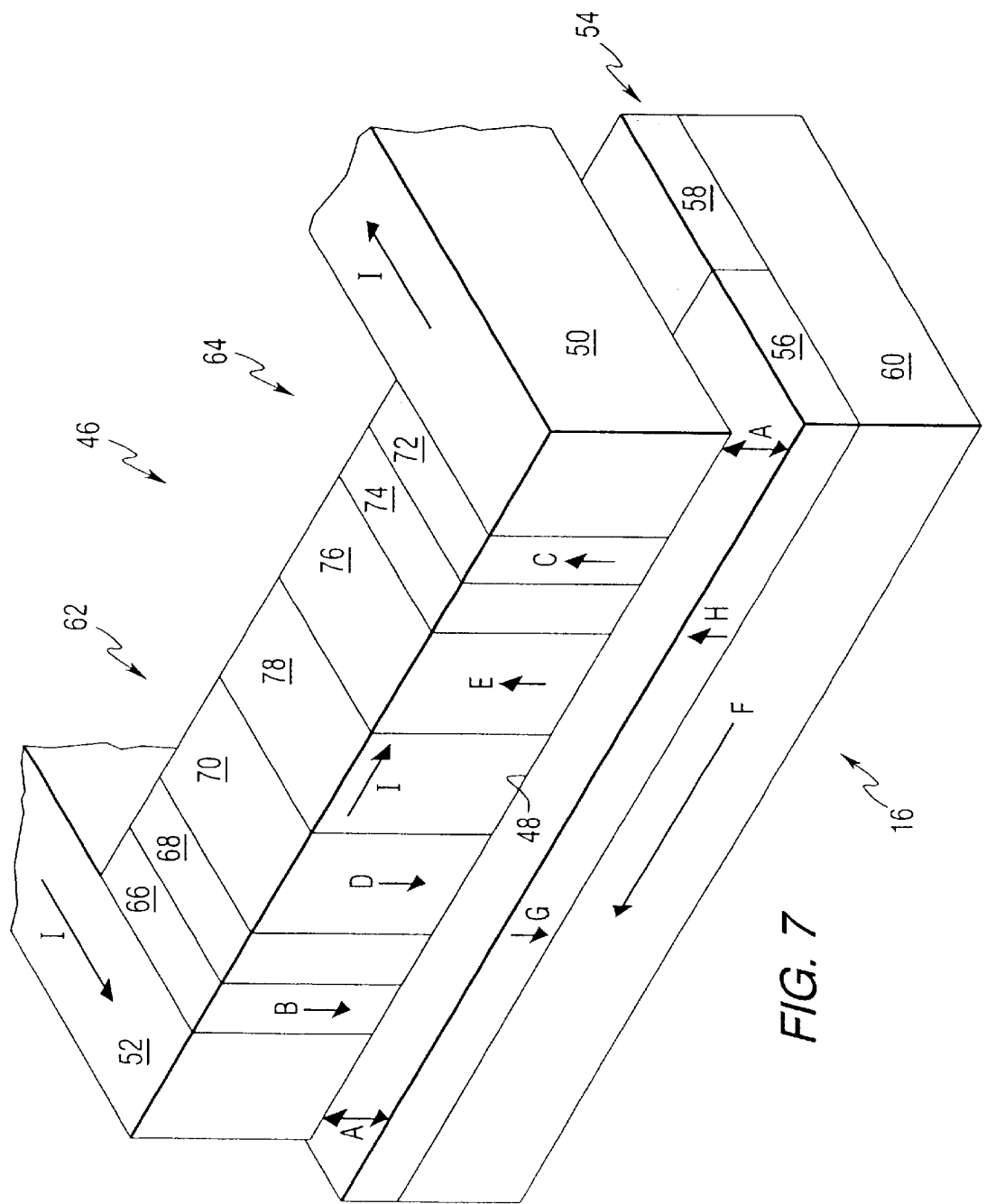
FIG. 7 is a partially schematic, isometric view of a differential dual spin valve according to the present invention, illustrating magnetizations within the layers during a read operation performed on a magnetic storage medium during a change in the magnetization within the storage medium from downward to upward.
Figure 10:
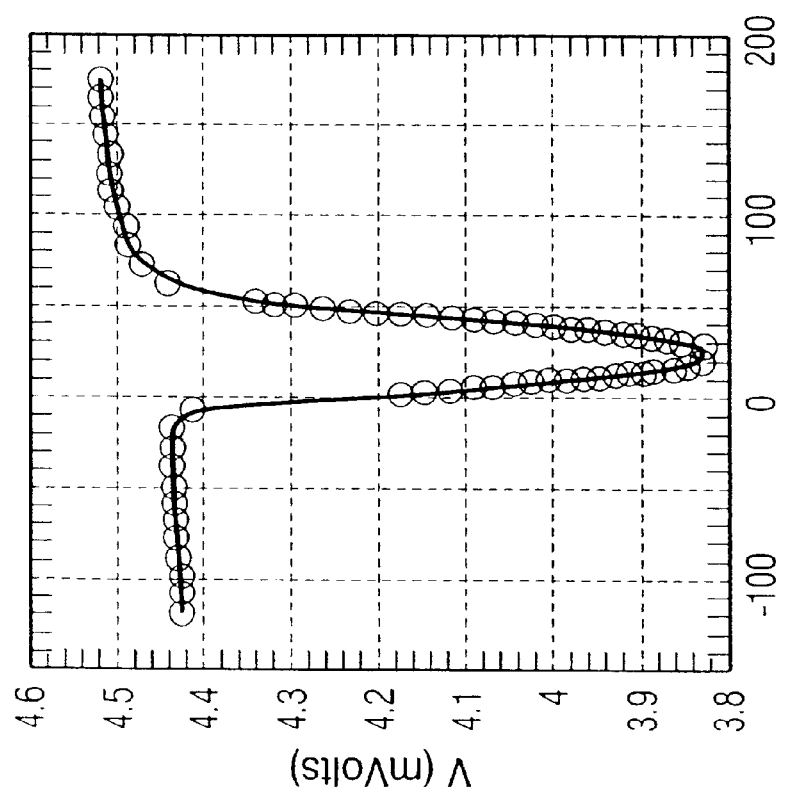
FIG. 10 is a graph illustrating the voltage of the sense current passing through the dual spin valve according to the present invention during a read operation performed on a magnetic storage medium having a magnetization change causing minimized resistance.

Referring to FIG. 7, the read element 46 has become aligned with a location on the track 56 wherein the orientation of the magnetizations within the track 56 is changing. With the magnetic storage medium 16 moving in the in direction of arrow F, the spin valve portion 64 will reach the location where the magnetization changes before the spin valve portion 62. Therefore, the spin valve portion 64 will briefly be aligned with the upward magnetization H within the track 56 at the same time as the spin valve portion 62 is aligned with the downward magnetization G within the track 56. The magnetization E within the free layer 76 will therefore rotate upward to correspond to the magnetization H, while the magnetization D will remain downward, corresponding to the magnetization G. At this point, the magnetizations B and D are parallel, thereby minimizing the resistance of the spin valve portion 62. At the same time, the magnetizations C and E are parallel, minimizing the resistance of the spin valve portion 64. Therefore, the test current I will sense the minimum level of resistance, indicating a binary "1." Referring briefly to FIG. 10, for a constant test current I, the decrease in the resistance of the spin valve portion 62, 64 will result in a brief decrease in the voltage across the read element 46, according to the well-known equation voltage=current×resistance.

Figure 8:
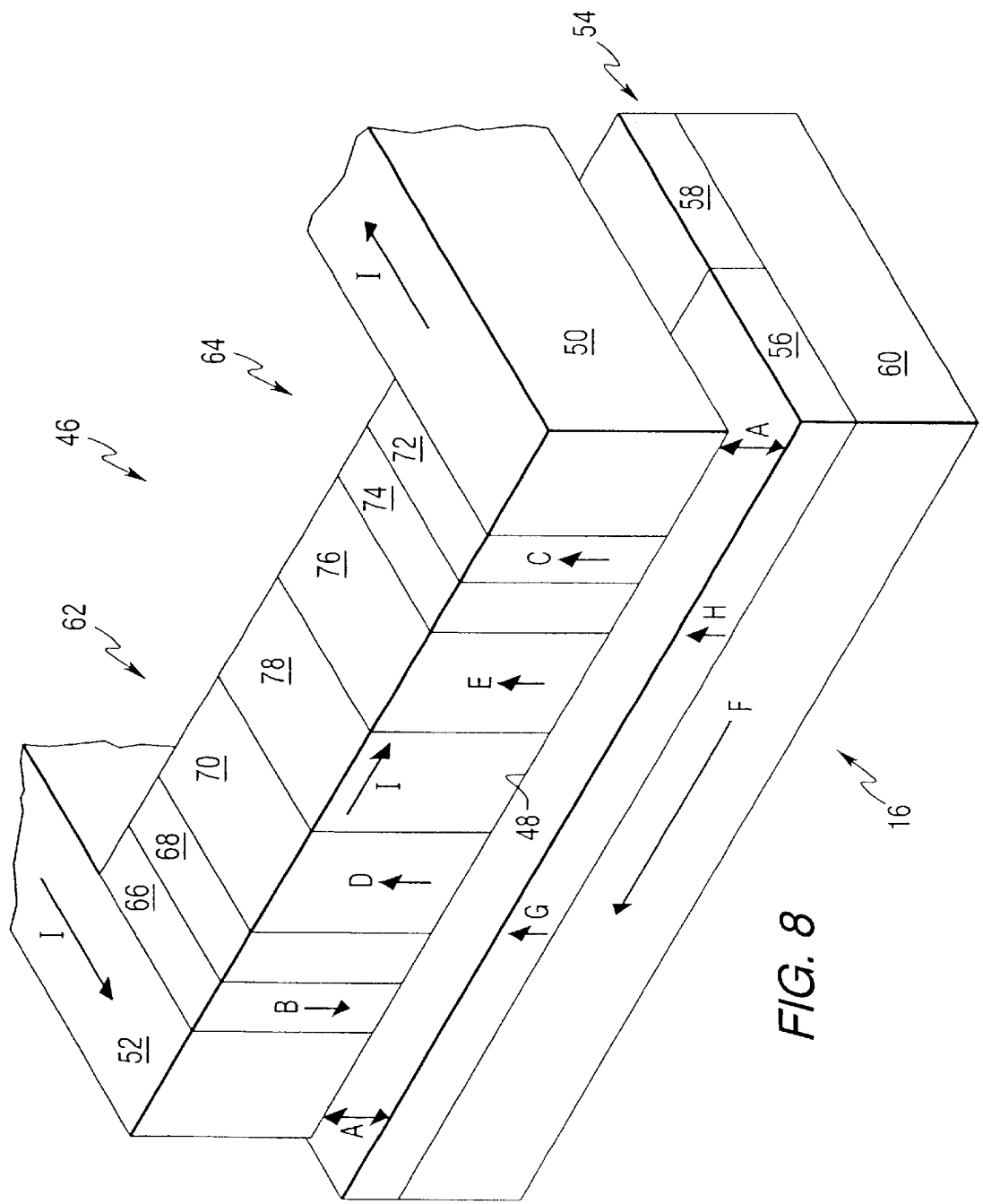
FIG. 8 is a partially schematic, isometric view of a differential dual spin valve according to the present invention, illustrating the magnetizations within the layers of the differential dual spin valve during a read operation performed on a magnetic storage medium having a constant upward oriented magnetization.

Referring to FIG. 8, the magnetic storage medium 16 has now moved sufficiently far relative to the read element 46 so that both spin valves 62, 64 are now located directly above magnetic domains within the track 56 having upward orientations. The magnetic fields generated by the domains of G and H will therefore rotate both the magnetization D and the magnetization E towards an upward orientation. Therefore, the magnetizations B, D are antiparallel, giving the first spin valve portion 62 its maximum level of resistance. At the same time, the second spin valve portion 64 has a minimum level of resistance, because the magnetizations C and E are parallel, thereby resulting in an increase in the level of resistance for the read element 46 from the minimum resistance of FIG. 7 to a medium resistance of FIG. 8. Referring back to FIG. 10, the increase in resistance results in an increase in the voltage of the test current from the maximum voltage back to a medium voltage. The constant orientation of the magnetizations G, H will be read as a binary "0."

Figure 9:
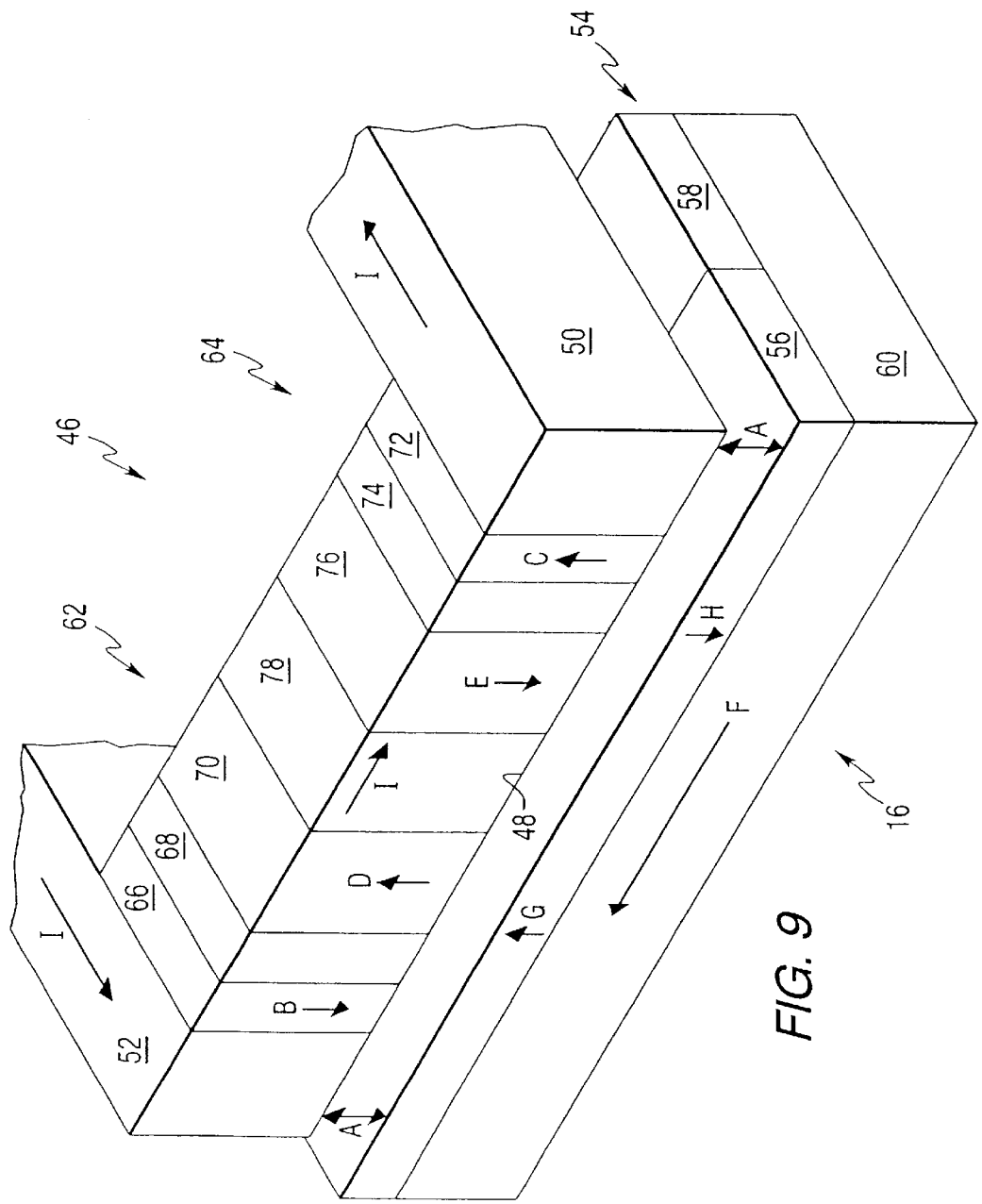
FIG. 9 is a partially schematic, isometric view of a differential dual spin valve according to the present invention, showing the magnetizations of the layers during a read operation performed on a magnetic storage medium having a magnetization changing from upward to downward.
Figure 11:
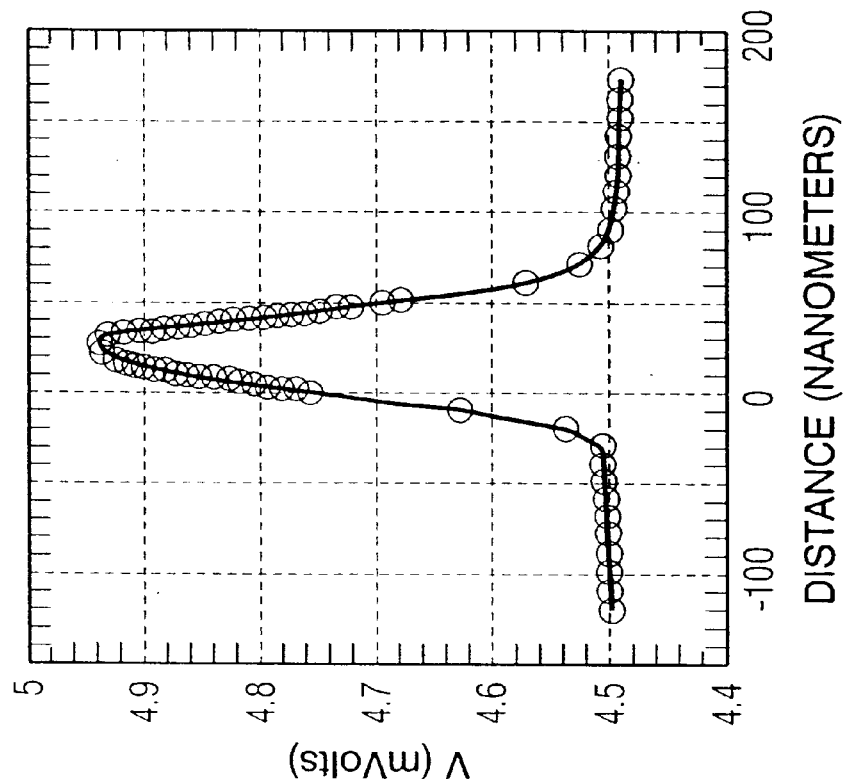
FIG. 11 is a graph illustrating the voltage of the sense current passing through a dual spin valve according to the present invention during a read operation performed on a magnetic storage medium having a magnetization change causing maximized resistance.

Referring to FIG. 9, continued movement of the magnetic storage medium 16 past the read element 46 has again caused the read element 46 to become aligned with a location wherein the magnetization of the track 56 changes. As before, the spin valve portion 64 reaches the new, downward magnetization H while the spin valve portion 62 is still located adjacent to the upward magnetization G. The magnetization E within the free layer 76 will therefore rotate to correspond to the magnetization H within the track 56, while the magnetization D within the free layer 70 will correspond to the magnetization G within the track 56. The magnetizations B, D within the spin valve portion 62 are now antiparallel, thereby maximizing the resistance of the spin valve portion 62. Likewise, the magnetizations C, E within the spin valve portion 64 are also antiparallel, thereby maximizing the resistance of the spin valve portion 64. Referring briefly to FIG. 11, the maximized resistance of the read element 46 results in the sense current I producing a maximized voltage. This change in resistance will be read as a binary "1." Continued movement of the magnetic storage medium 16 relative to the read element 46 causes a return to the condition illustrated in FIG. 6, wherein a constant downward magnetization within the track 56 causes a medium level of resistance within the read element 46, and corresponding medium level of voltage for the sense current I, read as a binary "0."

Figure 12:
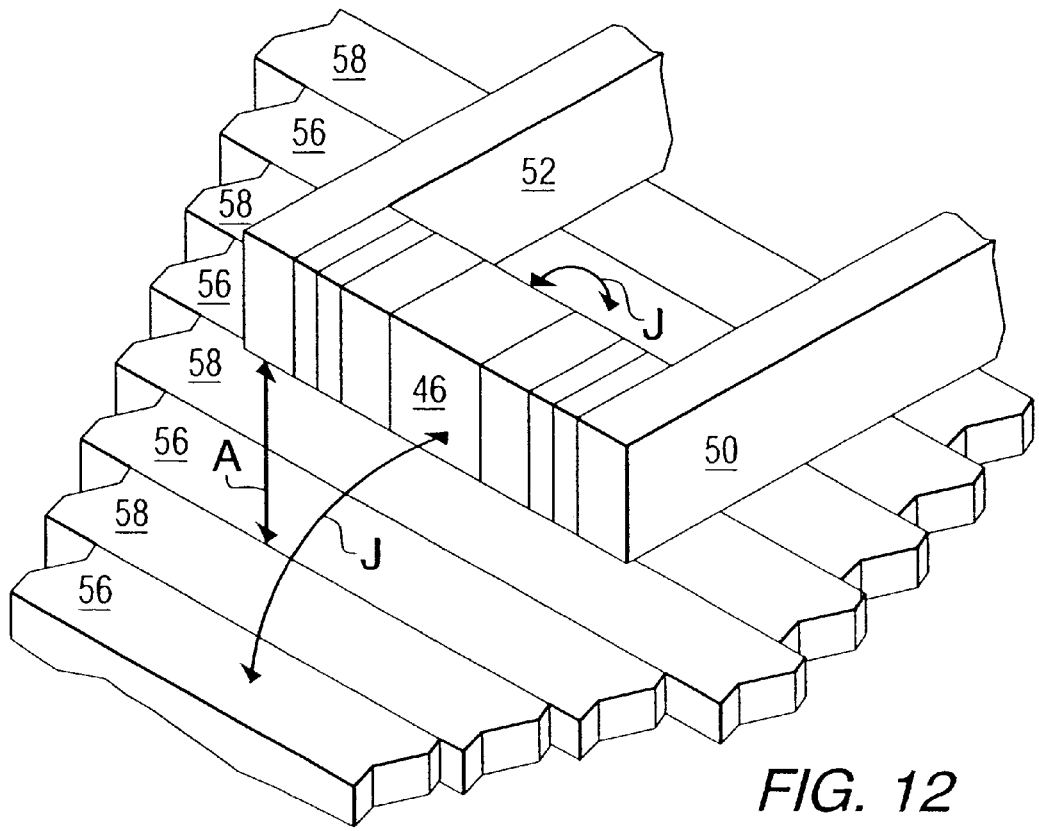
FIG. 12 is a partially schematic, isometric view of a read element, electrical contacts, and magnetic storage medium according to the present invention.

FIG. 12 illustrates why a spin valve in general, and a differential dual spin valve in particular, do not require such magnetic shields. With respect to adjacent tracks 56, the field component present at the location of the read element 46 will be a relatively weak horizontal component of the magnetic flux J. This magnetic field will act on the magnetizations D, E in relatively equal proportion, and to a much lesser extent than the magnetizations G, H within the track 56 that the read element 46 is directly above. The relatively weak magnetic field acting on magnetizations D, E will result in any effect on one of the magnetizations D, E being cancelled out by the much stronger magnetizations G, H. The magnetizations D and E within the free layers 70, 76 are sensitive primarily to changes in the magnetization within the track 56, across the gap film 78 unlike other types of spin valves, which are sensitive to changes in the magnetization of the track across the entire length of the spin valve. Therefore, other magnetic domains within the same track 56 will not effect the read element 46.

An integrated read/write structure of the present invention has two important advantages permitting the use of high recording densities within the magnetic storage medium 16. Presently available recording heads typically place the read element adjacent to the flux return pole, opposite the main write pole. Such a configuration places the main write pole and read elements a relatively large distance apart, thereby maximizing the effect of the skew angle on the location of both the main write pole and the read element with respect to the track upon which a read or write operation is being performed. An integrated read/write head 22 of the present invention places the main write pole 30 and read element 46 relatively close together, thereby minimizing the effects of the skew angle. This is important because it reduces complexity associated with jogging of the arm to position the heads on the track and reduces seek time. Both are important for fast access time drives with high storage capacity. Second, conventional spin valves need shields for linear resolution, while the differential dual spin valve as used within the present invention is sensitive to changes in the magnetizations within the track 56 only across the gap film 78, thereby making it possible to read from a track 56 having magnetic domains located closer together.

Figure 13:
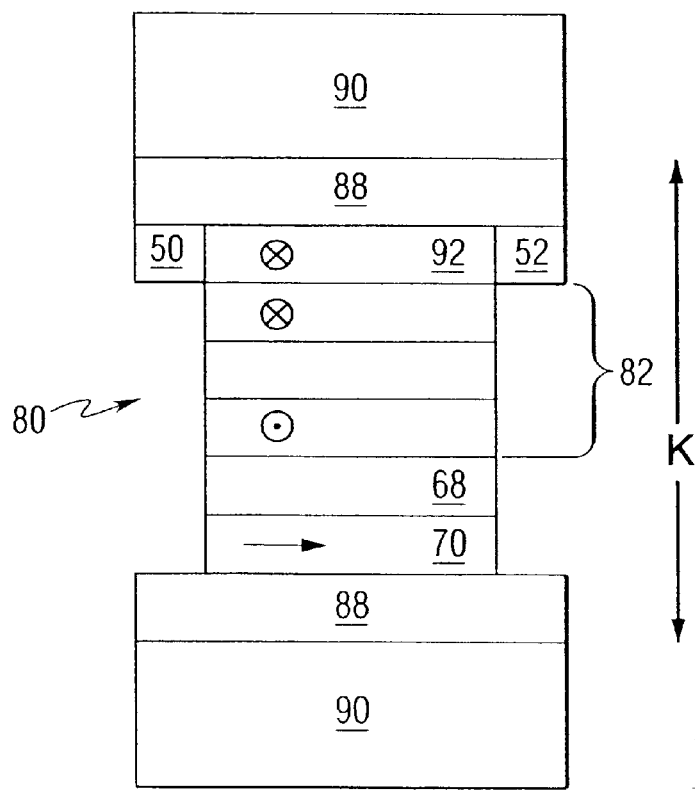
FIG. 13 is a side view of a prior art spin valve.
Figure 14:
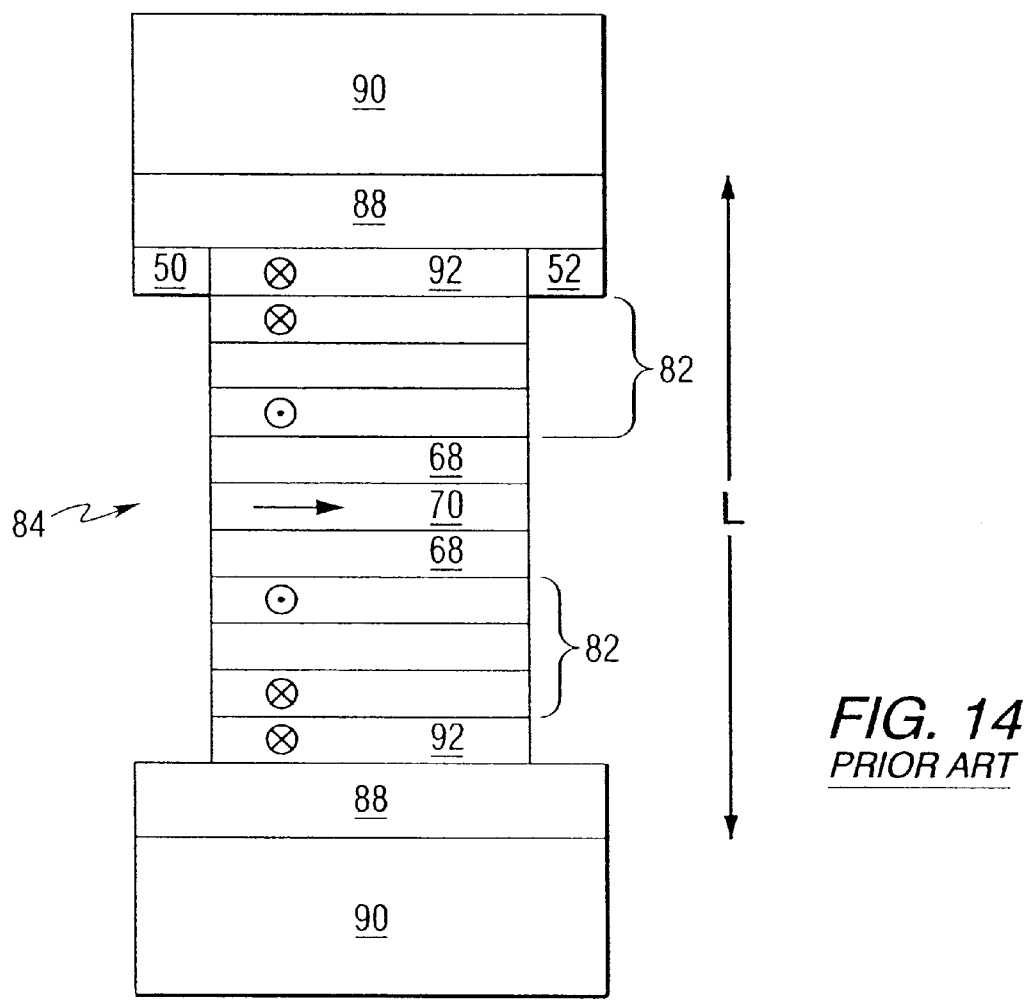
FIG. 14 is a side view of a prior art dual spin valve.
Figure 15:
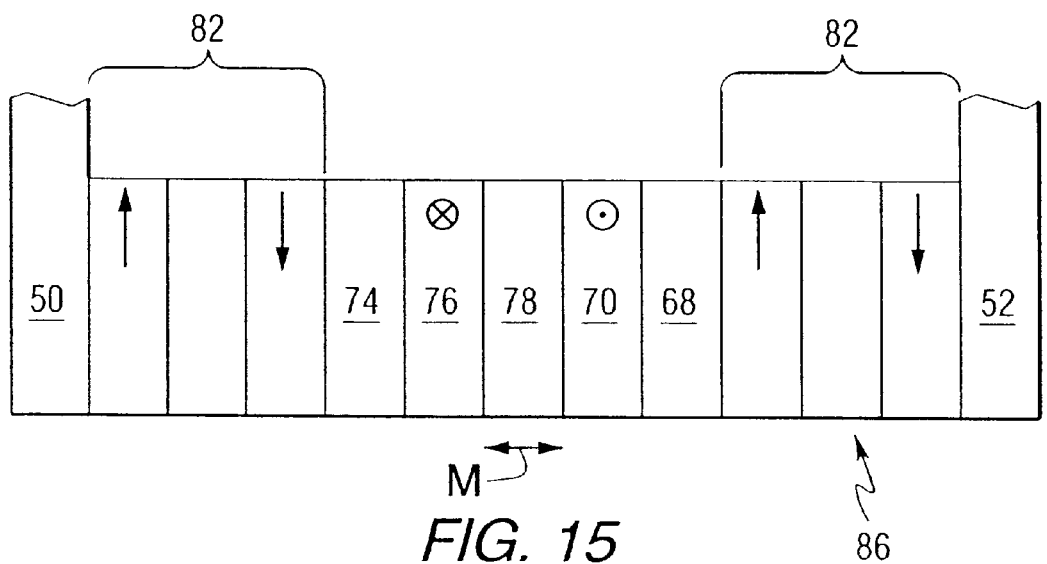
FIG. 15 is a side view of a differential dual spin valve according to the present invention.

This second advantage is best illustrated by FIGS. 13–15. FIG. 13 illustrates a prior art current in plane (CIP) spin valve 80 having an antiferromagnetic layer including a synthetic antiferromagnet 82 forming the pinned layer, an electroconductive layer 68, and a free layer 70. Antiferromagnetic layer 92 is located at the top of the spin valve 80. Electrical contacts 50,52 are located on opposing sides of the spin valve 80. The entire structure is located between the magnetic shields 90, with insulation 88 separating the shields 90 from the spin valve 80 and electrical contacts 50,52. FIG. 14 illustrates a prior art CIP dual spin valve 84, having a pair of synthetic antiferromagnets 82 on either side of a free layer 70 with an electroconductive layer 68 separating each synthetic antiferromagnet 82 from the free layer 70. Antiferromagnetic layers 92 are located at the top and bottom of the dual spin valve 84. Electrical contacts 50,52 are located on opposing sides of the dual spin valve 84. The entire structure is located between the magnetic shields 90, with insulation 88 separating the shields 90 from the dual spin valve 84 and electrical contacts 50,52. FIG. 15 illustrates another embodiment of a differential dual spin valve 86 according to the present invention, wherein the synthetic antiferromagnets 82 form the pinned layers. Whereas the spin valve 80 and dual spin valve 84 are sensitive to changes in the magnetization within the magnetic storage medium across the entire distance between the shields 90, represented by the arrows K and L, respectively, the differential dual spin valve 86 (and likewise the differential dual spin valve 46) is sensitive to changes in the magnetization of the magnetic storage medium only across the gap 78, represented by the arrow M. From these figures, the increase in recording density made possible by the differential dual spin valve becomes apparent.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A perpendicular recording head for use with magnetic storage media, said perpendicular recording head comprising:
   a main write pole;
   a flux return pole magnetically coupled to said main write pole; and
   a differential dual spin valve read element disposed between said main write pole and said flux return pole.

2. The perpendicular recording head according to claim 1, wherein:
   said read element comprises at least two ferromagnetic layers and at least one electroconductive layer; and
   said layers are oriented perpendicular to an imaginary line extending from a central axis of the main write pole to a central axis of the flux return pole, along an air bearing surface of said recording head.

3. A perpendicular recording head, for use with magnetic storage media, said perpendicular recording head comprising:
   a main write pole;
   a flux return pole magnetically coupled to said main write pole;
   a read element disposed between said main write pole and said flux return pole; and
   a pair of electrical contacts disposed on opposing ends of said read element;
   wherein said read element comprises at least two ferromagnetic layers and at least one electroconductive layer; and
   said electrical contacts are dimensioned and configured to supply a test current perpendicular to a plane defined by one of said layers within said read element.

4. A perpendicular recording head for use with magnetic storage media, said perpendicular recording head comprising:

a main write pole;

a flux return pole magnetically coupled to said main write pole; and a read element disposed between said main write pole and said flux return pole;

wherein said main pole and said read element are separated by a distance of at least approximately 0.1 μm.

5. A magnetic recording apparatus, comprising:

a perpendicular recording head comprising:

a main write pole;

a flux return pole magnetically coupled to said main write pole; and a differential dual spin valve read element disposed between said main write pole and said flux return pole; and a magnetic storage medium, comprising:

a recording layer having a plurality of magnetized tracks, and a lower layer being magnetically soft relative to said tracks.

6. The magnetic recording apparatus according to claim 5, wherein:

said read element comprises at least two ferromagnetic layers and at least one electroconductive layer; and said layers are oriented perpendicular to an imaginary line extending from a central axis of the main write pole to a central axis of the flux return pole, along an air bearing surface of said recording head.

7. A magnetic recording apparatus, comprising:

a perpendicular recording head comprising:

a main write pole;

a flux return pole magnetically coupled to said main write pole; and a read element disposed between said main write pole and said flux return pole;

a magnetic storage medium, comprising:

a recording layer having a plurality of magnetized tracks, and a lower layer being magnetically soft relative to said tracks;

a pair of electrical contacts disposed on opposing ends of said read element; and wherein said electrical contacts are dimensioned and configured to supply a test current perpendicular to a plane defined by a layer within said read element.

8. A magnetic recording apparatus, comprising:

a perpendicular recording head comprising:

a main write pole;

a flux return pole magnetically coupled to said main write pole; and a read element disposed between said main write pole and said flux return pole;

a magnetic storage medium, comprising:

a recording layer having a plurality of magnetized tracks, and a lower layer being magnetically soft relative to said tracks;

wherein said main pole and said read element are separated by a distance of at least approximately 0.1 μm.

* * * * *